US010573044B2

(12) United States Patent
Singh Rathore et al.

(10) Patent No.: US 10,573,044 B2
(45) Date of Patent: Feb. 25, 2020

(54) SALIENCY-BASED COLLAGE GENERATION USING DIGITAL IMAGES

(71) Applicant: Adobe Inc., San Jose, CA (US)

(72) Inventors: Shailendra Singh Rathore, Jodhpur (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 195 days.

(21) Appl. No.: 15/808,625

(22) Filed: Nov. 9, 2017

(65) Prior Publication Data
US 2019/0139282 A1    May 9, 2019

(51) Int. Cl.
*G06K 9/00* (2006.01)
*G06T 11/60* (2006.01)
*G06K 9/46* (2006.01)
*G06K 9/62* (2006.01)

(52) U.S. Cl.
CPC .......... *G06T 11/60* (2013.01); *G06K 9/4642* (2013.01); *G06K 9/4676* (2013.01); *G06K 9/6215* (2013.01); *G06T 2210/12* (2013.01)

(58) Field of Classification Search
CPC combination set(s) only.
See application file for complete search history.

(56) References Cited

U.S. PATENT DOCUMENTS

| 2010/0199227 A1* | 8/2010 | Xiao | G06F 3/0481 715/863 |
| 2010/0226564 A1* | 9/2010 | Marchesotti | G06K 9/4671 382/159 |

* cited by examiner

*Primary Examiner* — Alex Kok S Liew
(74) *Attorney, Agent, or Firm* — SBMC

(57) ABSTRACT

Saliency-based collage generation techniques are described. A collage generation module is executed by a computing device and receives multiple digital images. The collage generation module then generates multiple saliency maps from the digital images that describe a visual saliency of respective pixels in the digital images. The saliency maps are then used by the collage generation module to fit bounding boxes to portions of the digital images that are considered salient. Collage candidates are generated by the collage generation module based on predefined layouts and the bounding boxes that are fit the portions of the digital images. The collage generation module then selects at least one collage from these collage candidates for output to a user based on the determined amounts of deviation.

20 Claims, 11 Drawing Sheets

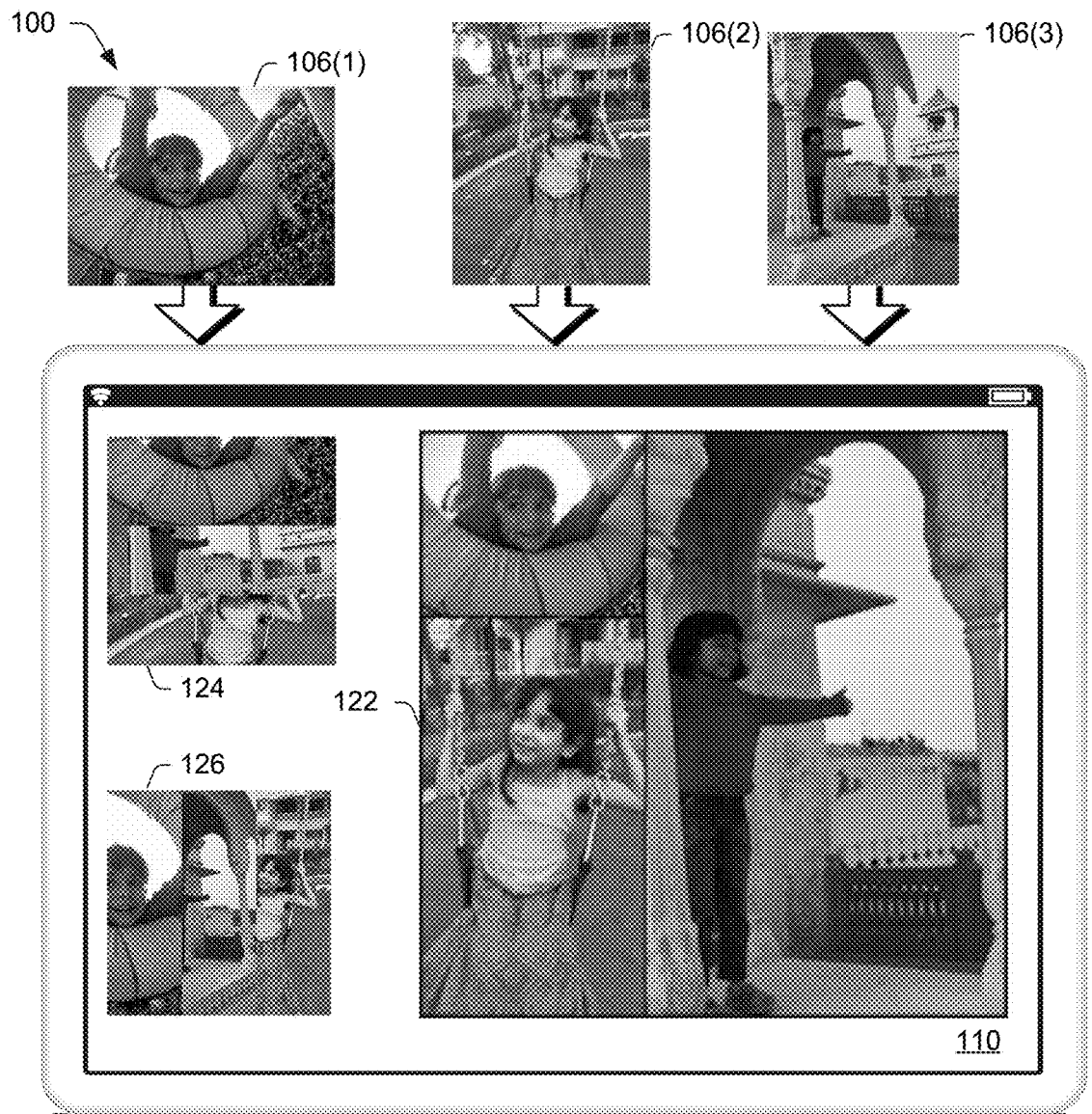
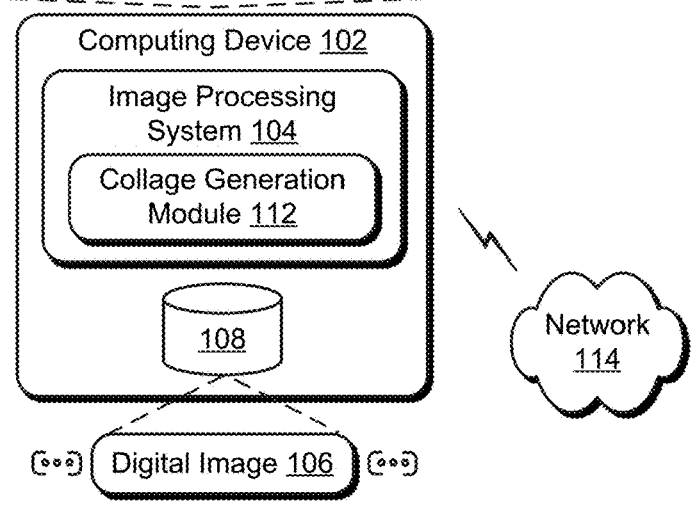
Fig. 1

800

```
for each Grammar in PartitionGrammars {
    [salientViewsAspects doPermutation: {
        //Parse Partition Grammar to construct Layout Hierarchy
        for each Token in Grammar
        {
            if (/Terminal Node Token/)
            {
                //Leaf nodes
                node.imageID = inImageIndex;
                node.aspectRatio = salientRectangleAspect;
            }
            else /Non-Terminal Node Token/
            {
                if (node.alignmentIsHorizontal) {
                    node.aspectRatio = firstChild.aspectRatio + secondChild.aspectRatio;
                } else {
                    node.aspectRatio = (firstChild.aspectRatio * secondChild.aspectRatio)/
(firstChild.aspectRatio + secondChild.aspectRatio);
                }
            }
        }
        //Aspect Ratio for the given Layout
        computedAspectRatio = AutoLayoutGenerator.root.AspectRatio;
        //Order of Images in the given Layout
        terminalNodes = AutoLayoutGenerator.leafNodes;

if (ABS(computedAspectRatio - desiredAspectRatio) < currentError) {
            chosenLayout[LAYOUT_TERMINAL_NODES] = terminalNodes;
            chosenLayout[COMPUTED_ASPECT_RATIO] = computedAspectRatio;
        }
    }];
}

Output: CHOSEN_LAYOUT
```

Fig. 8

SALIENCY-BASED COLLAGE GENERATION USING DIGITAL IMAGES

BACKGROUND

Collages are used to combine multiple digital images together through interaction with a computing device to form a single digital image as a work of art. A user, for instance, may capture a variety of digital images during a vacation and wish to combine a representative collection of these images into a single collage. The collage, as a result, acts to enable viewing of these images together as a single work of art.

Conventional techniques used by a computing device to create collages from digital images, however, may be tedious and frustrating to perform in practice. To begin, the user selects a collection of digital images. Conventionally, the user is then tasked with manually resizing and rearranging the selected digital images through interaction with the computing device. The user, for instance, may manually select a preconfigured layout having a collection of partitions. The user then manually determines which digital images are to be included in which partitions, and is often forced to manually resize the digital images to fit within those partitions.

Even after these interactions are performed, the user may then decide that the layout as having the digital images is flawed and then choose another layout and repeat this process. Accordingly, conventional techniques as implemented by a computing device may be frustrating to the user and are computationally inefficient by requiring repeated interaction with the computing device to achieve a desired result.

SUMMARY

Saliency-based collage generation techniques are described that are implemented by a computing device to generate a collage from multiple digital images automatically and without user interaction. To do so, a collage generation module is executed by the computing device and receives multiple digital images. The collage generation module then generates multiple saliency maps from the digital images that describe a visual saliency of respective pixels in the digital images, i.e., how unique each of the pixels are with respect to other pixels in the pixel's neighborhood based on color, intensity, texture, and so on based on a nearest neighbor technique.

The saliency maps are then used by the collage generation module to fit bounding boxes to portions of the digital images that are considered salient, such as to include a threshold number of salient pixels. Collage candidates are generated by the collage generation module based on predefined layouts and the bounding boxes that are fit the portions of the digital images. The layouts, for instance, may have an overall defined shape as well as defined shapes of partitions within the layout. The collage generation module first selects a subset of layouts that have a number of partitions that match a number of digital images to be included as part of the collage. The collage generation module then employs this subset of layouts to generate collage candidates by fitting the digital images to the partitions based on the bounding boxes, e.g., by aligning them to each other to the extent possible.

The collage candidates are then processed by the collage generation module to determine an amount the respective collage candidates deviate from the bounding boxes, e.g., based on aspect ratio, overall area, and so forth. The amount of deviation is then used to rank the collage candidates from "best" to "worst." In other words, from a most optimal collage candidate to a least optimal collage candidate based on how well the bounding boxes fit within respective partitions.

The collage generation module then selects at least one collage from these collage candidates for output to a user based on the determined amounts of deviation, may output the collage candidates as a ranked list, and so on. In this way, the collage generation module may generate the collage to support user-specified digital images automatically and without user intervention in a manner that conserves computational resources of a computing device as compared with conventional techniques that required repeated user interactions to manually resize and rearrange digital images in a variety of layouts.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ saliency-based collage generation techniques described herein.

FIG. 8 depicts an example implementation of pseudo code using partition grammar of predefined layouts.

DETAILED DESCRIPTION

Overview

Conventional techniques to generate a collage from multiple digital images typically require a significant amount of manual interaction on the part of a user to achieve a desired result. As a result, performance of the conventional techniques through interaction with a computing device is computationally inefficient by requiring this repeated interaction to achieve a desired result, and thus is also often considered tedious by the user.

Figure 4A:
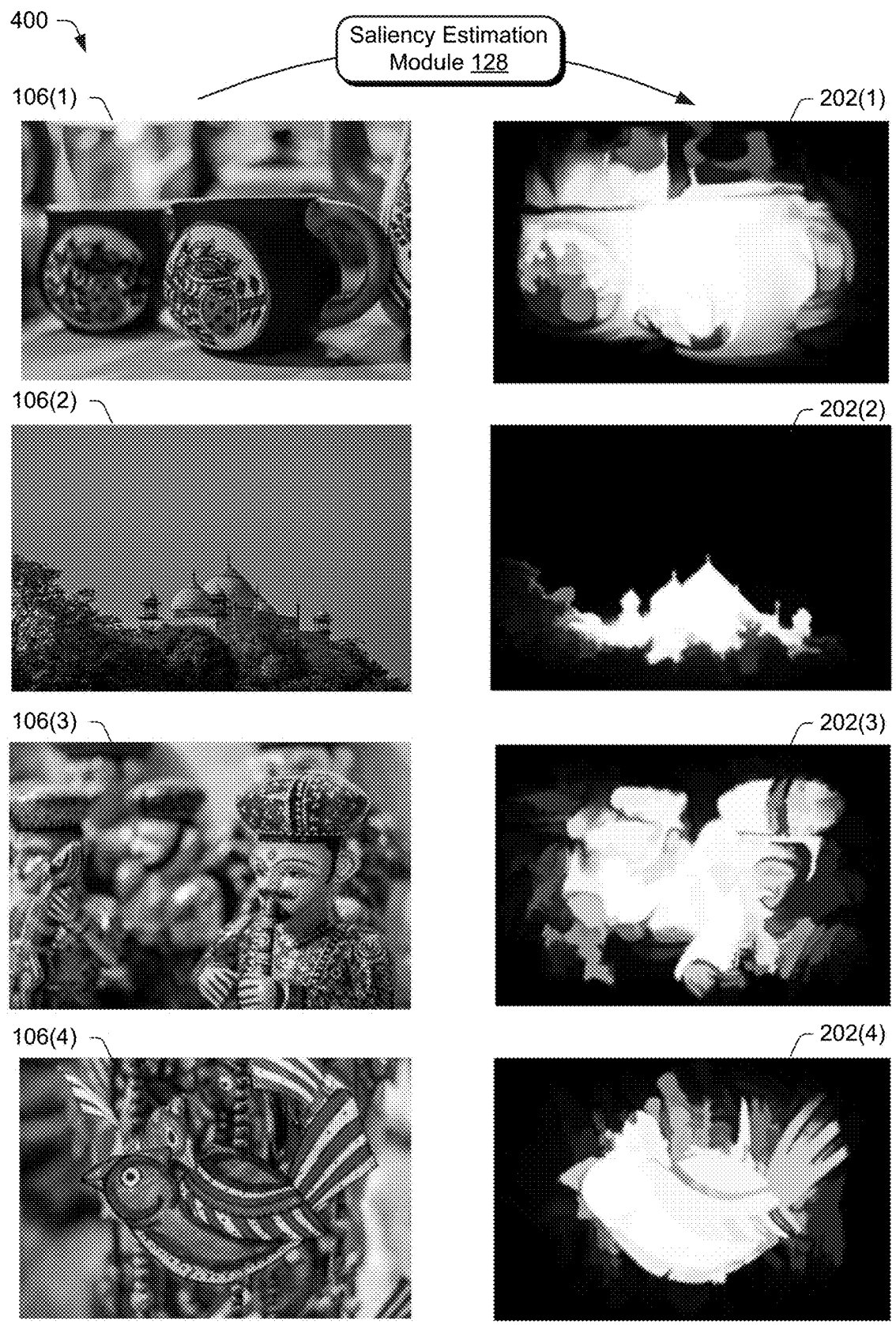
FIG. 4A depicts an example of generation of saliency maps as defining saliency of pixels within the digital images of FIG. 3.

Accordingly, saliency-based collage generation techniques are described that configure a computing device to generate a collage in real time from multiple digital images automatically and without user interaction. To do so, a collage generation module is executed by the computing device and receives multiple digital images, e.g., from a user's digital album. The collage generation module then generates multiple saliency maps from the digital images that describe a visual saliency of respective pixels in the digital images. The saliency maps, for instance, may include corresponding saliency values for the pixels based on uniqueness of the pixel in relation to other pixels in a neighborhood of the pixel. This uniqueness may be based on a variety of characteristics, examples of which include color, intensity, or texture. The saliency maps, for instance, may be generated using a nearest-neighbor technique based on an amount that a value for a characteristic of a pixel deviates from values for that characteristic for other pixels in a neighborhood of the pixel. This amount may be represented in the saliency maps a variety of ways, such in a grayscale range from dark representing lower amounts of deviation and thus saliency to light representing greater amount of deviation and thus saliency as shown in FIG. 4A. Other techniques include use of machine learning, as example of which is further described in relation to FIG. 4B.

The saliency maps are then used by the collage generation module to fit bounding boxes to portions of the digital images that are considered salient. The bounding boxes, for instance, may have defined edges that form an outer border of the bounding boxes. This outer border is defined to include a threshold amount of pixels that are considered salient based on a respective saliency map, e.g., using heuristics to include at least a ratio amount of salient pixels within a rectangular area. In this way, the bounding boxes act to define "what is visually important" in respective digital images.

The collage generation module is then configured to generate collage candidates based on predefined layouts. The layouts, for instance, may have an overall defined shape (e.g., square, rectangular, circular) as well as defined shapes and sizes of partitions within the layout, such as portrait, landscape, and so on. This may be defined using a partition grammar A first layout, for instance, may include a partition grammar of "HVV," for horizontal, vertical, and vertical partitions whereas a second layout may have a partition grammar of "VV," a third layout may have a partition grammar of "VHH," and so on.

Accordingly, the collage generation module may first select a subset of layouts, based on the partition grammar, that have a number of partitions that match a number of digital images to be included as part of the collage. The collage generation module then employs this subset of layouts to generate collage candidates by fitting the digital images to the partitions based on the bounding boxes and corresponding partition grammar. This may be done, for instance, by aligning bounding boxes to corresponding shapes of partitions based on the partition grammar. This process may iterate over a single layout as well as for multiple layouts of the subset. The collage generation module, for instance, may fit the digital images to a single layout in a variety of combinations, which may also be repeated for other layouts from the subset to generate the collage candidates.

The collage candidates are then processed by the collage generation module to determine an amount the candidates deviate from the bounding boxes. To do so, the collage generation module determines an amount of change in an aspect ratio of the bounding boxes, an amount of area of the bounding boxes that is maintained in the layouts, an amount of salient pixels from the bounding boxes that are included in the partitions, and so on. Thus, the amount of deviation may be used to rank the collage candidates from "best" to "worst," i.e., from a most optimal collage candidate to a least optimal collage candidate.

The collage generation module then selects one or multiple collage candidates as a collage for output to a user, automatically and without user intervention. The collage generation module, for instance, may output the "best" collage candidate, an ordered list of collage candidates for selection by a user, and so forth. In this way, the collage generation module may generate the collage to support user-specified digital images automatically and without user intervention in a manner that conserves computational resources of a computing device by not involving a repeated "back and forth" of conventional techniques. Further discussion of these and other examples is included in the following sections.

In the following discussion, an example environment is first described that may employ the techniques described herein. An example procedure is then described which may be performed in the example environment as well as other environments. Consequently, performance of the example procedure is not limited to the example environment and the example environment is not limited to performance of the example procedure.

Example Environment

FIG. 1 is an illustration of a digital medium environment 100 in an example implementation that is operable to employ saliency-based collage generation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device as illustrated.

An example of functionality incorporated by the image processing system 104 to process the image 106 is illustrated as a collage generation module 112. The collage generation module 112 is implemented at least partially in hardware of the computing device (e.g., by a processing system and computer-readable storage medium as described in relation to FIG. 9) to generate a collage as a single piece of art as including a collection of digital images.

The collage generation module 112, for instance, may receive multiple digital images 106(1), 106(2), 106(3). From these digital images 106(1)-106(3), the collage generation module 112 generates a plurality of collage candidates 122, 124, 126 and from these selects at least one of the candidates for output, e.g., display in the user interface 110. Although illustrated as implemented locally at the computing device 102, functionality of the image processing system 104 and collage generation module 112 may also be implemented as whole or part via functionality available via a network 114, such as part of a web service or "in the cloud."

To do so, the collage generation module 112 estimates saliency of pixels within the digital images 106(1)-106(3), automatically and without user intervention, to determine which portions of the digital images 106(1)-106(3) are to be used as a basis to form the collage. Visual saliency is a distinct subjective perceptual quality which makes some objects, and corresponding pixels, in the digital image "stand out" from the rest of the digital images. Visual saliency is determined by the collage generation module 112 by examining characteristics such as color, intensity, texture, and so on of a pixel in relation to other pixels within a defined neighborhood of the pixel. Thus, pixels that exhibit at least a threshold amount of variance with respect to these characteristics are thus considered to be salient, i.e., are likely noticeable to a user. This is opposed to pixels that do not exhibit this threshold amount and thus do not vary from other pixels in the neighborhood and thus do not stand out from those pixels. Thus, visual saliency is usable to describe what is important in the digital images. Based on this determination of saliency, the collage generation module 112 then generates collage candidates 122, 124, 126 using predefined layouts and determines which layout "is best" based on how salient pixels within the digital images 106(1)-106(3) appear in the collage candidates 122, 124, 126.

In the illustrated example of FIG. 1, for instance, the collage generation module 112 may examine the digital images 106(1)-106(3) and based on this examination, identify pixels as salient that involve representation of people, i.e., the children in the images. Based on this identification, the collage generation module 112 generates collage candidates 122-126 that are based on this identification such that partitions in preconfigured layouts are populated based on the identified portions of the digital images that are considered salient.

The collage generation module 112 may then select a collage from the collage candidates 122-126 based on deviation of the collage candidates 122-126 from pixels that are considered salient. In the illustrated example, for instance, the collage generation module 112 determines that pixels involving the children are salient. However, collage candidates 124, 126 have fewer numbers of these salient pixels than collage candidate 122. Accordingly, the collage generation module 112 selects collage candidate 122 for output to a user, automatically and without user intervention, because this collage candidate 122 deviates the least from pixels that have been identified as salient within the digital images 106(1)-106(3). In this way, the collage generation module 112 may determine which of the collage candidates 122-126 are "best" or "most optimal" based on this identification of saliency, further discussion of which may be found in relation to FIGS. 2-9.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
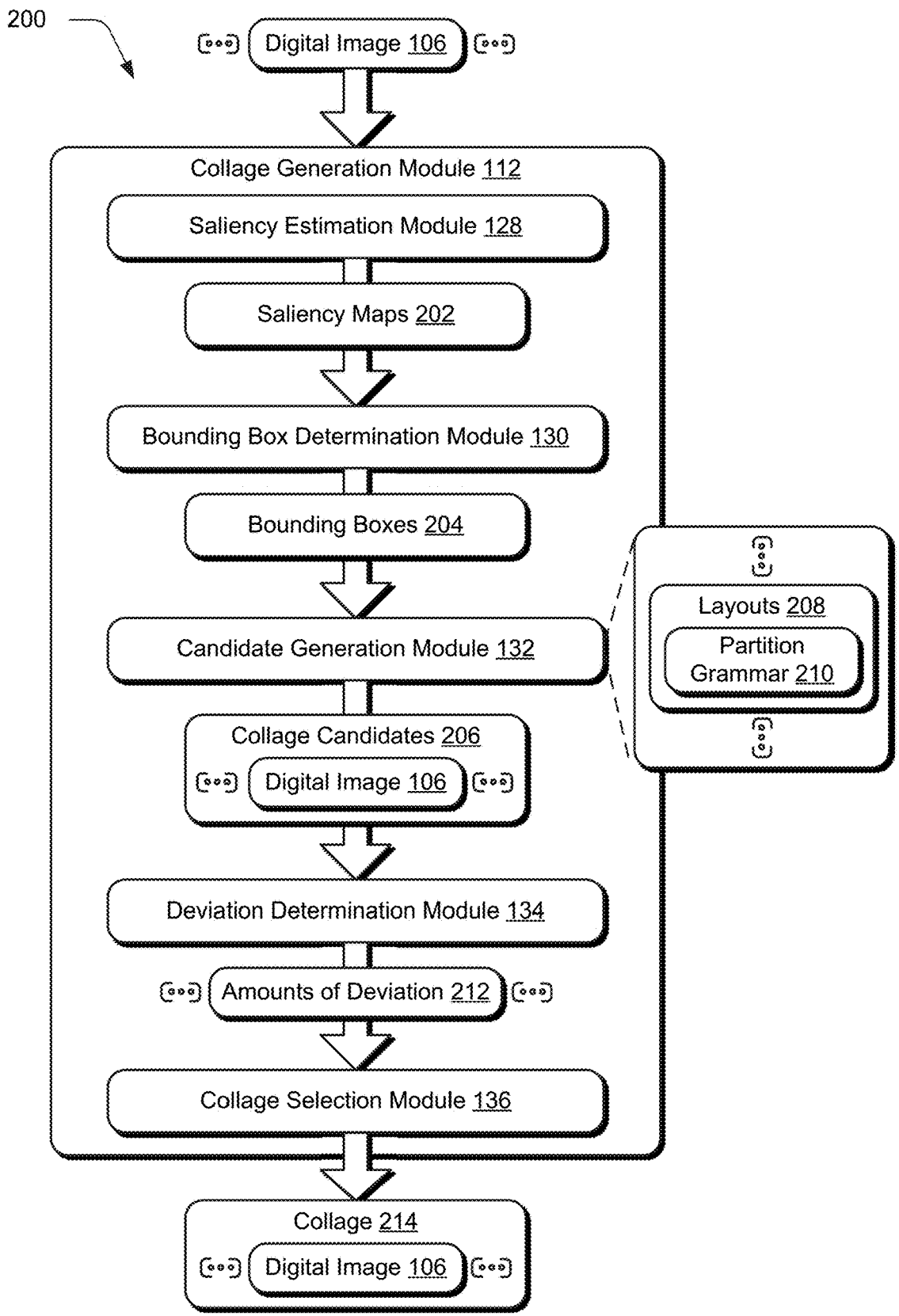
FIG. 2 depicts a system in an example implementation showing operation of a collage generation module of FIG. 1 in greater detail.
Figure 3:
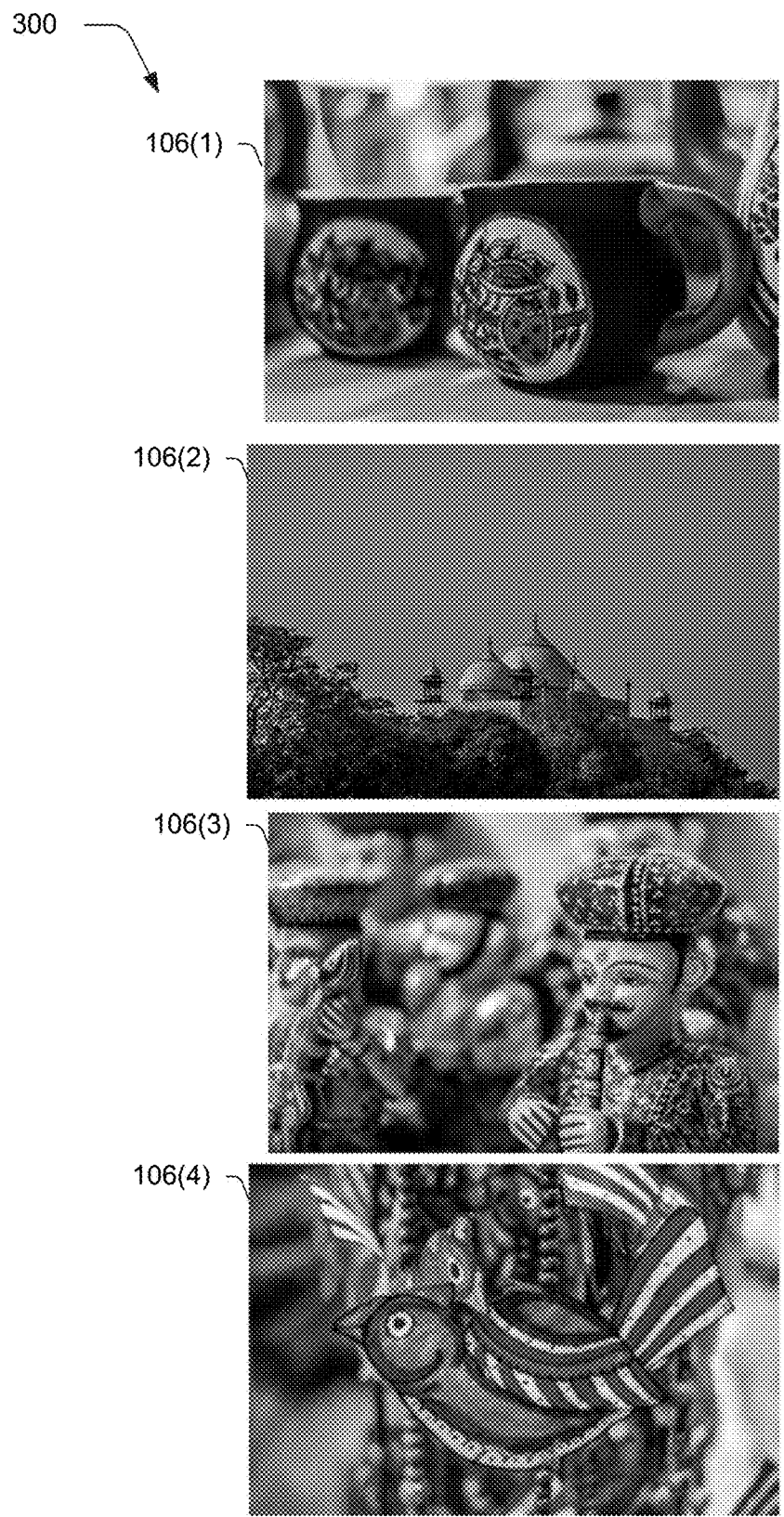
FIG. 3 depicts an example of digital images used as a basis by the collage generation module to form the collage.
Figure 4B:
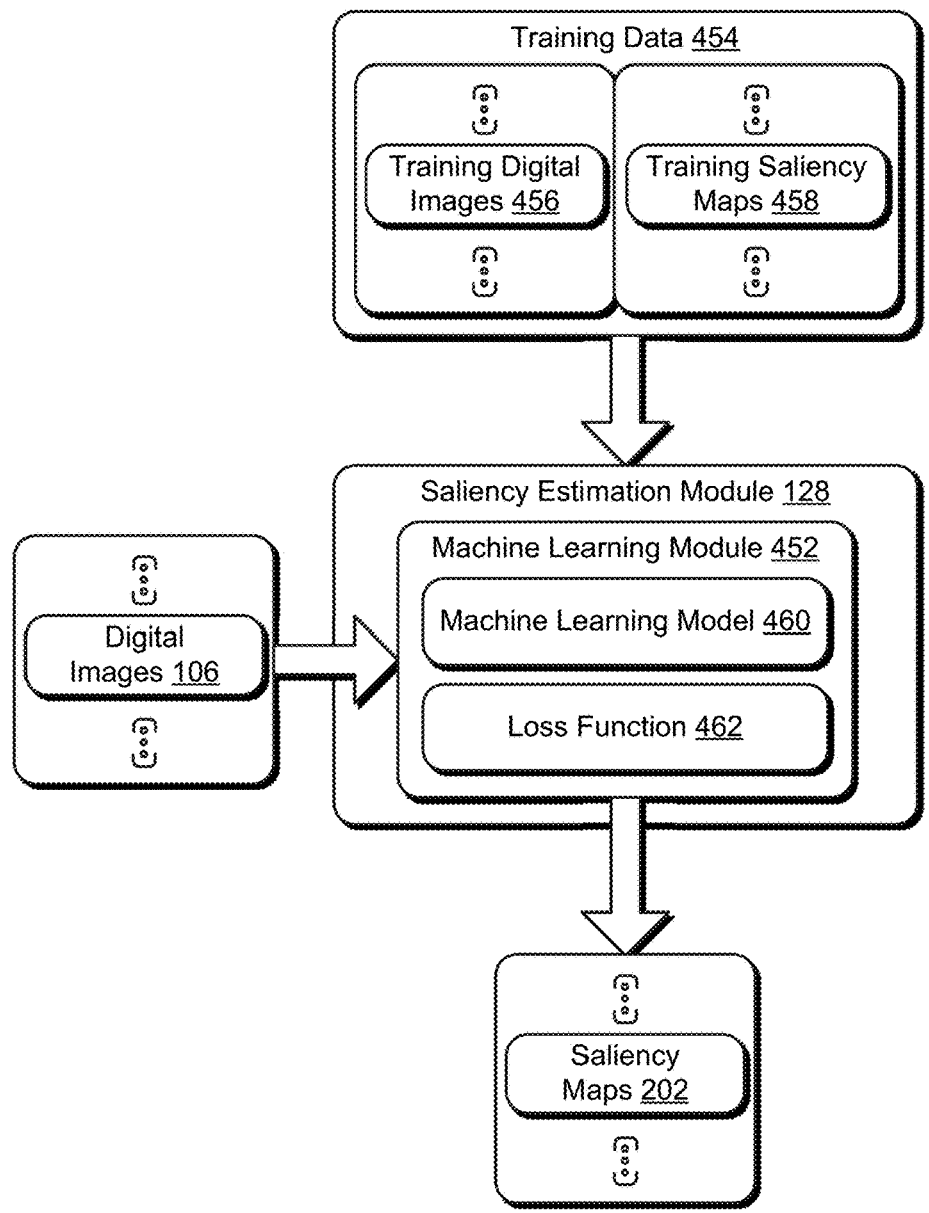
FIG. 4B depicts another example of generation of saliency maps as defining saliency of pixels within the digital images of FIG. 3.
Figure 5:
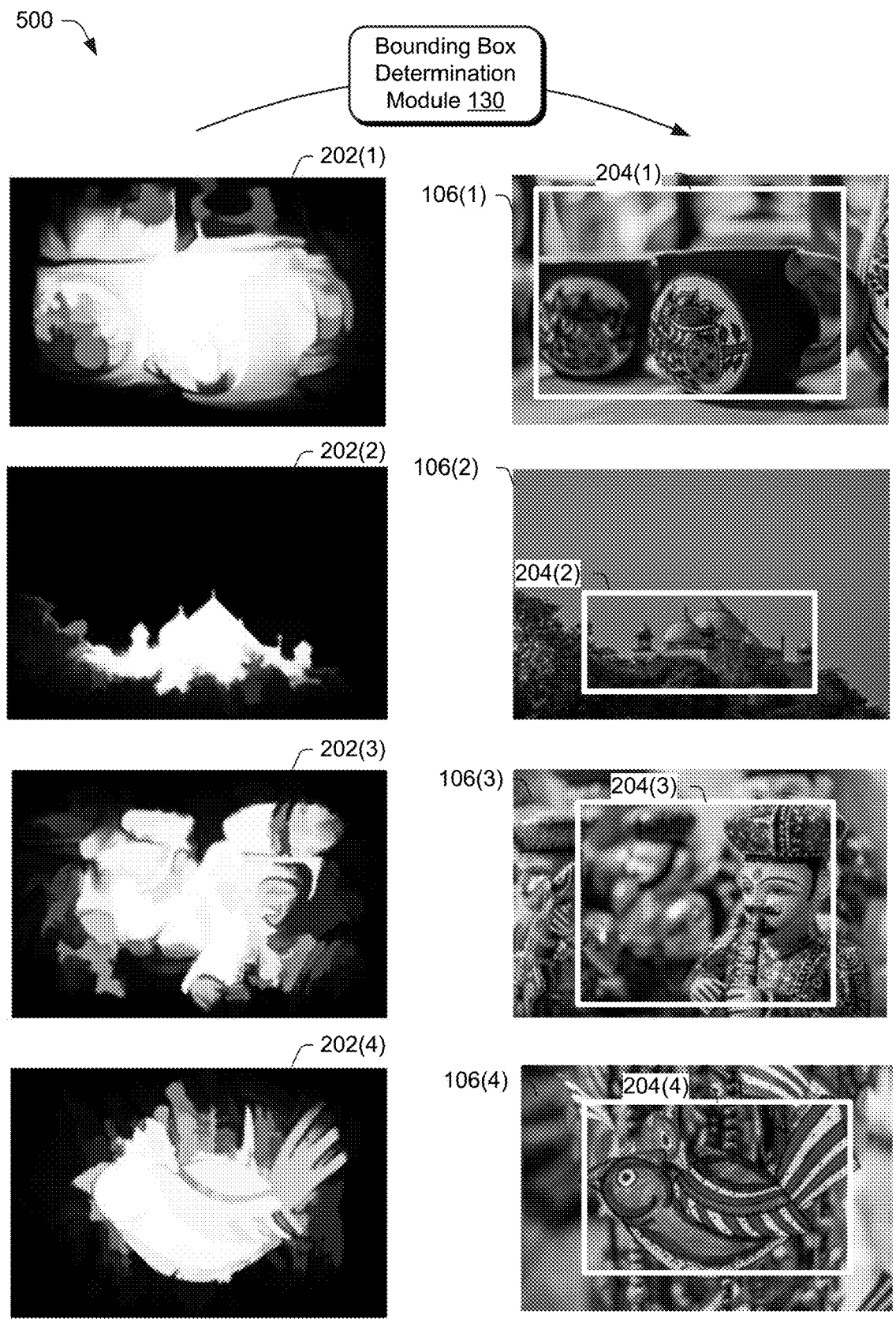
FIG. 5 depicts an example implementation showing fitting of bounding boxes based on the generated saliency maps of FIG. 4.
Figure 6:
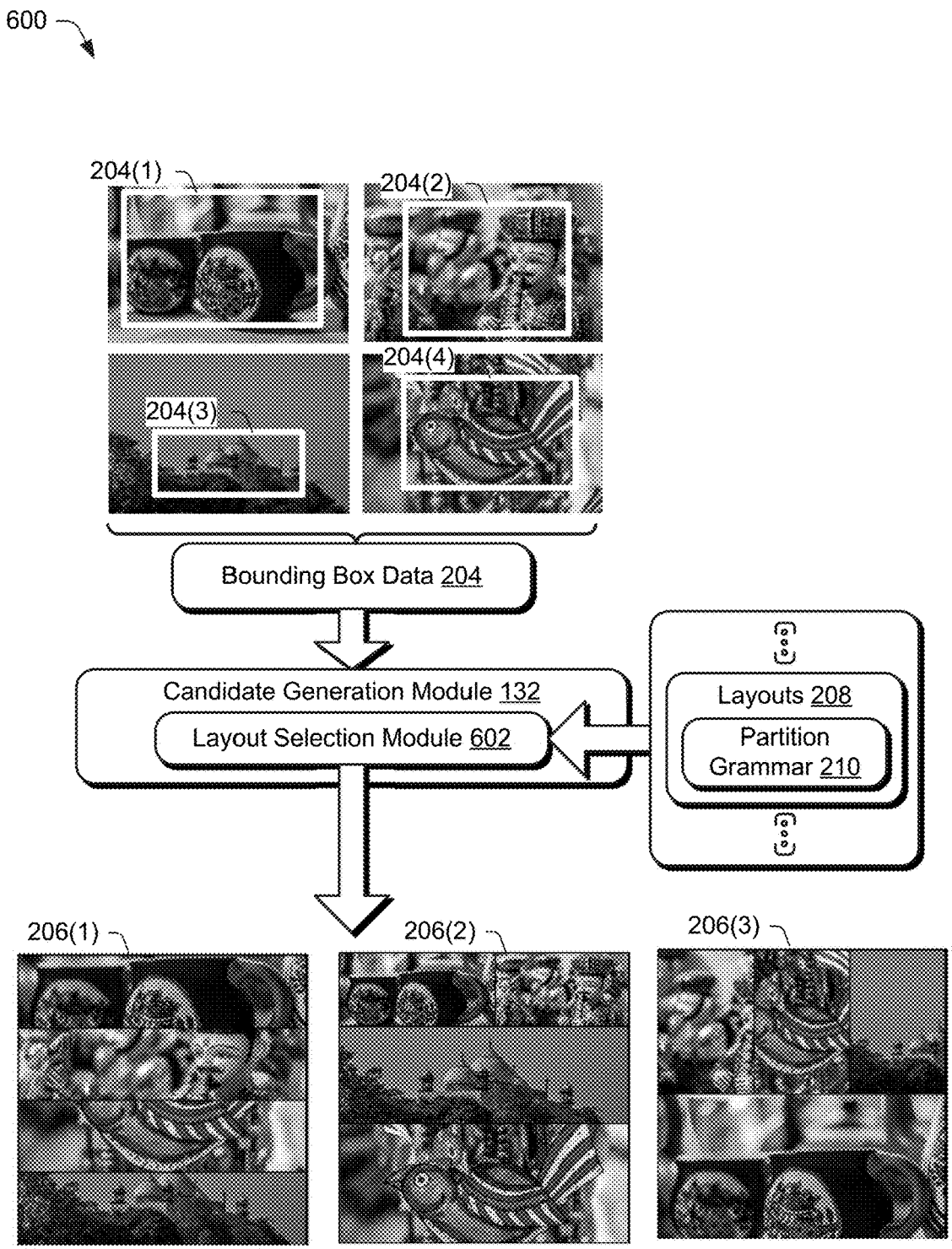
FIG. 6 depicts an example implementation of generate of collage candidates based on the bounding boxes of FIG. 5 and selection of a collage based on deviation analysis.
Figure 7:
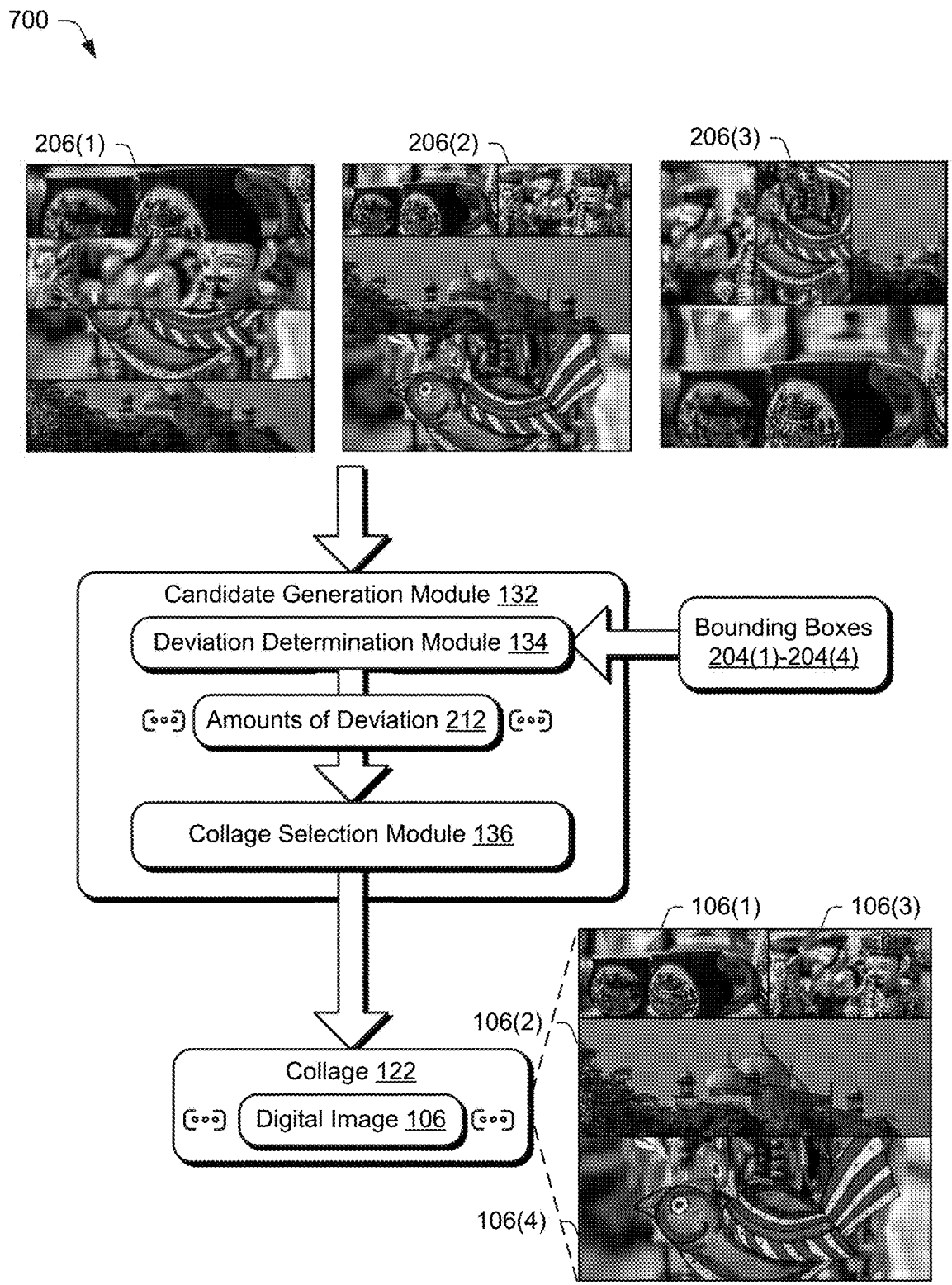
FIG. 7 depicts an example implementation of determining amounts that collage candidates of FIG. 6 deviate from bounding boxes of FIG. 5 and selection of a collage based on deviation analysis.
Figure 9:
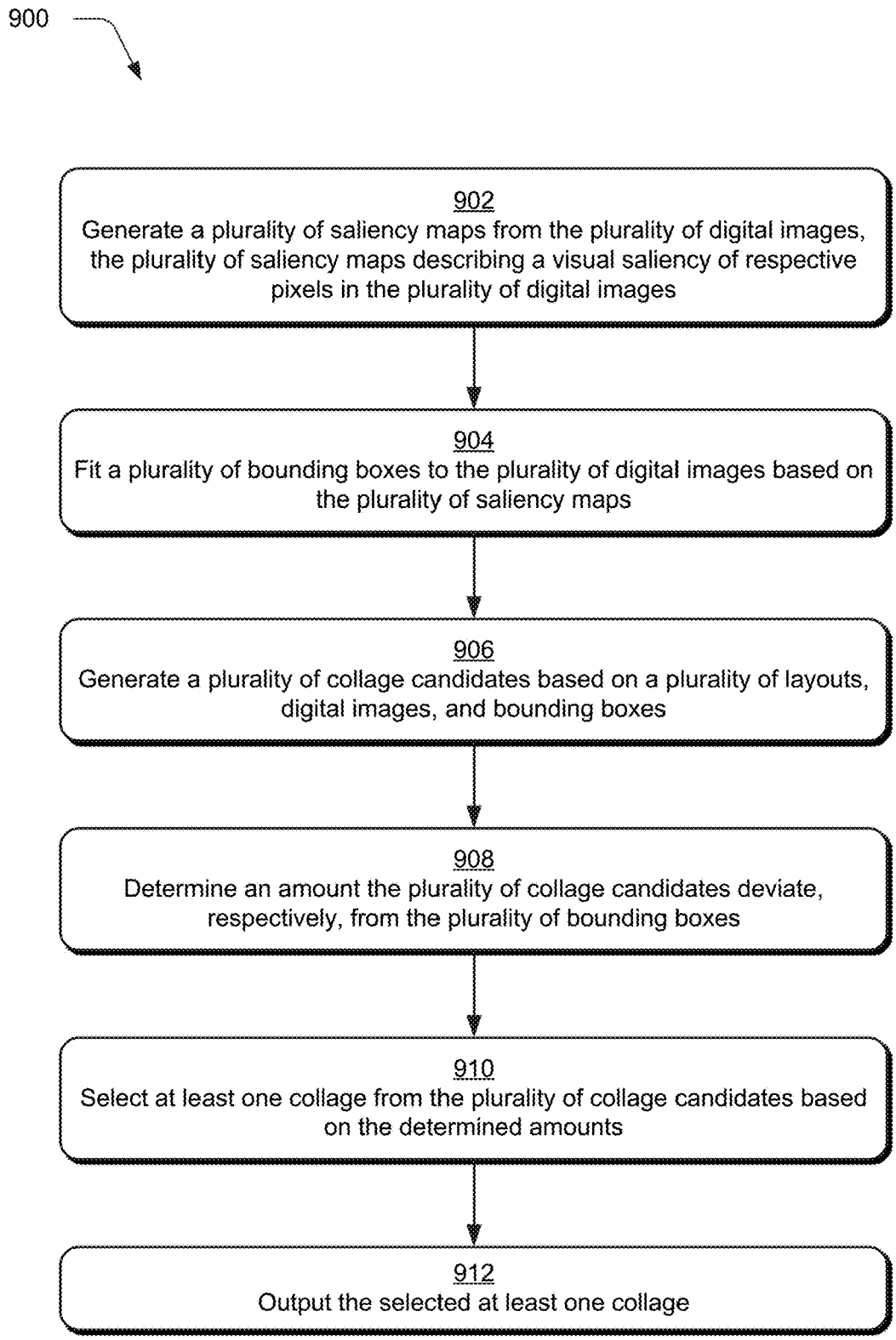
FIG. 9 is a flow diagram depicting a procedure in an example implementation of saliency-based collage generation using digital images.

FIG. 2 depicts a system 200 in an example implementation showing operation of the collage generation module 112 in greater detail. FIG. 3 depicts an example 300 of digital images used as a basis by the collage generation module to form the collage. FIGS. 4A and 4B depict examples 400, 450 of generation of saliency maps as defining saliency of pixels within the digital images of FIG. 3. FIG. 5 depicts an example implementation 500 showing fitting of bounding boxes based on the generated saliency maps of FIG. 4. FIG. 6 depicts an example implementation 600 of generation of collage candidates based on the bounding boxes of FIG. 5 and selection of a collage based on deviation analysis. FIG. 7 depicts an example implementation 700 of determining amounts that the collage candidates of FIG. 6 deviate from the bounding boxes of FIG. 5 and selection of a collage based on deviation analysis. FIG. 8 depicts an example implementation 800 of pseudo code using partition grammar of predefined layouts. FIG. 9 depicts a procedure 900 in an example implementation of saliency-based collage generation using digital images.

The following discussion describes techniques that may be implemented utilizing the described systems and devices. Aspects of the procedure may be implemented in hardware, firmware, software, or a combination thereof. The procedure is are shown as a set of blocks that specify operations performed by one or more devices and are not necessarily limited to the orders shown for performing the operations by the respective blocks. In portions of the following discussion, reference will be made interchangeably to FIGS. 2-9.

To begin, a plurality of digital images 106 are received by the collage generation module 122. The computing device 102, for instance, may receive user inputs selecting a collection of digital images 106 from an album maintained locally at the computing device 102, remotely via the network 114, and so forth. The selected images are then provided to the saliency estimation module 128.

The saliency estimation module 128 is configured to generate a saliency map 202 for each digital image 106 that describes visual saliency of respective pixels in the plurality of digital images (block 802). As shown in the example implementation 400 of FIG. 4A, for instance, the saliency maps 202(1)-202(4) generated for respective digital images 106(1)-106(4) define a respective amount of visual saliency for pixels within the digital images 106(1)-106(4). The visual saliency of the illustrated saliency maps 202(1)-202(4) is illustrated such that higher amounts of saliency have increasing levels of brightness and conversely lesser amounts of increasing levels of darkness.

As previously described, visual saliency is a distinct subjective perceptual quality which makes some objects, and corresponding pixels, in the digital images 106(1)-106(4) "stand out" from the rest of the digital images. In digital image 106(1), for instance, the salient pixels are used to represent ceramic mugs. In digital image 106(2), the salient pixels represent a temple, in digital image 106(3), the salient pixels represent a ceramic toy, and in digital image 106(4) the salient pixels represent toy birds. Thus, in each of these instances saliency of the pixels is used to distinguish objects in a foreground in respective digital image from a background of the image.

Visual saliency is determined by the collage generation module 112 in FIG. 4A by comparing values of characteristics such as color, intensity, texture, and so on of a pixel in relation to other pixels within a defined neighborhood of the pixel. Thus, pixels that exhibit at least a threshold amount of variance with respect to these characteristics are thus considered to be salient, i.e., are likely noticeable to a user. This is opposed to pixels that do not exhibit this threshold amount and thus do not vary from other pixels in the neighborhood and thus do not "stand out" from those pixels. Thus, visual saliency is usable to describe "what is important" in the digital images, which is leveraged in the following to generate the collage.

This may also be performed by the saliency estimation module 128 using machine learning as shown in FIG. 4B through use of a machine learning module 452. The saliency estimation module 128, for instance, may receive training data 454 including training digital images 456 and training saliency maps 458. The training data 454 is then processed by the machine learning module 452 to train a machine learning model 460. As used herein, a machine learning model refers to a digital representation that can be trained (e.g., tuned) based on inputs to approximate unknown functions. A machine learning model, for instance, may be trained to make predictions on known data by analyzing the known data to learn to generate outputs that reflect patterns and attributes of the known data. Examples of machine learning models include, but are not limited to, decision trees, support vector machines, linear regression, logistic regression, Bayesian networks, random forest learning, dimensionality reduction algorithms, boosting algorithms, artificial neural networks, deep learning, and so forth. Thus, a machine learning model 460 makes high-level abstractions in data by generating data-driven predictions or decisions from the known input data.

The machine learning model 460, for instance, may be trained by the machine learning module 452 using the training data 454 as obtained from an image repository. The image repository in this example includes a plurality of training digital images 456 that include different scenarios with a variety of objects in different numbers/positions and corresponding training saliency maps 458. This allows the machine learning module 452 to train the machine learning model 460 to address a variety of scenarios to more accurately identify subjects of interest in digital images.

To do so, the machine learning module 452 trains the machine learning model 460 by generating a plurality of predicted saliency maps from the training digital images 456. As part of this, the machine learning module 452 identifies features including shapes, colors, object boundaries, and/or other visual elements for distinguishing objects within the digital training image 456. By analyzing features of the training digital images 456 (e.g., at various levels of abstraction or depths within levels of a neural network) the machine learning module 452 generates a predicted saliency map for the training digital images 456. This may be done, for instance, by assigning a first value to salient pixels and a second value to non-salient pixels in an array stored in a computer-readable storage medium of the computing device 102.

The machine learning module 452 then utilizes the training saliency maps 458 to verify the accuracy of the predicted saliency maps and further train the machine learning model. For example, the machine learning module 452 can compare the predicted saliency maps with the training saliency maps 458. A loss function 462 may then be used to back-propagate a measure of loss back through the network (e.g., to change node weights in a neural network) to train the machine learning model 460.

For instance, the machine learning model can determine the differences between predicted saliency maps and the training saliency maps 458 by utilizing a loss function 462. The loss function 462, for instance, compares the predicted saliency maps and the training saliency maps 458 and determines a measure of loss, i.e., as a measure of difference, such as mean squared error or mean absolute loss. In one example, the loss function 462 determines a measure of loss for each pixel between the predicted value from the predicted saliency map and the actual value from the training saliency map 458. Accordingly, the loss function 462 is used by the machine learning module 452 to determine whether the predicted value for each pixel is correct in each training digital image 456.

The machine learning module 452 uses the loss function 462 (e.g., the measure of loss resulting from the loss function 462) to train the machine learning model 460. In particular, the machine learning module 452 utilizes the loss function 462 to correct functions or parameters in the machine learning model 460 that resulted in incorrect predicted values from the predicted saliency maps to minimize the loss function 462. By minimizing the loss function 462, the machine learning module 452 improves the accuracy of the machine learning model 460 to predict whether pixels in an image belong to a salient object and thus acts to train the model The machine learning model 460 may also employ a test dataset (e.g., segmented from the training data 454) to verify the accuracy of the machine learning model 460. For example, after training the machine learning model 460 on a first set of the training digital images 456, the machine learning module 452 may use a second set of the training data 454 to verify the accuracy of the model 460.

Furthermore, the training saliency maps 458 may also be generated based on user input. For example, a user can create a training saliency map 206 for a training digital image 456 by manually marking the salient objects through interaction with a user interface. Alternatively or additionally, the user can view the predicted saliency map for the training digital image 456 and then mark incorrectly predicted values (e.g., for individual pixels or for partial or whole objects) to create the training saliency map 458. This may be performed through interaction with a user interface of the computing device 102 that facilitates quick, manual marking of objects for a training saliency map 458 through the use of image processing techniques and intelligent selection tools.

Furthermore, the machine learning module 452 may update the machine learning model 460 to fine-tune the saliency map generation process. For instance, the machine learning module 452 can generate saliency maps 202 for each digital image 106. Additionally, the machine learning module 452 can generate focused preview images for the digital images 106 and user feedback may be collected to correct erroneous identification of salient objects. When the machine learning module 452 generates the new saliency maps and/or receives feedback, the machine learning module 452 can use the new maps/feedback to update the loss function, and thus update the machine learning model 460, itself.

As described above, the machine learning module 452 can train the machine learning model 460 using training data 454 that includes training digital images 456 and training saliency maps 458. The machine learning module 452 can use any type of machine learning techniques capable of predicting salient objects within digital images. This includes supervised learning, unsupervised learning, or reinforcement learning. For example, the machine learning model 460 can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, and so forth.

Regardless of how formed, the saliency map 202 is then provided to a bounding box determination module 130 as shown in FIG. 2. The bounding box determination module 130 is configured to fit a plurality of bounding boxes 204 to the plurality of digital images 106 based on the plurality of saliency maps 202 (block 804). This fitting may be performed by the bounding box determination module 130 in a variety of ways depending on saliency of the pixels within the digital images 106(1)-106(4) as defined by the saliency maps 202(1)-202(4).

As shown in the example implementation of FIG. 5, the bounding box determination module 130 receives the plurality of saliency maps 202(1)-202(4) for the respective digital images 106(1)-106(4). From this, the bounding box determination module 130 generates the bounding boxes 204(1), 204(2), 204(3), 204(4) as a rectangle having a minimum size to enclose a set of pixels that have been identified as salient based on the saliency maps 202(1)-202(4). The bounding box determination module 130, for instance, may first determine which pixels are considered salient based on whether saliency values for the pixels within the saliency map have at least a defined amount of saliency, i.e., an amount of uniqueness with respect to other pixels within a neighborhood of those pixels.

The bounding box determination module 130 then defines the edges (i.e., boundary) of the bounding boxes 204(1)-204(4) to include a threshold amount of the pixels that are identified as salient. The bounding boxes 204(1)-204(4), for instance, may be defined to include a defined ratio of salient pixels to non-salient pixels, e.g., eighty percent. This defined ratio may be set by the collage generation module 112, defined using heuristics, specified by a user setting, and so forth. In this way, a size of the bounding boxes 204(1)-204(4) is sized to have a minimum area of salient pixels within the digital images 106(1)-106(4) as defined by the saliency maps 202(1)-202(4). In some instances, multiple bounding boxes may be generated for a single digital image, e.g., in which clusters of salient pixels are separated by a threshold distance in a respective saliency map.

Returning again to FIG. 2, the bounding boxes 204 are then provided to a candidate generation module 132. The candidate generation module 132 is configured to generate a plurality of collage candidates 206 based on a plurality of layouts 208, the plurality of digital images 106, and the plurality of bounding boxes 204 (block 906). Each of the plurality of layouts 208, for instance, may have a defined outer boundary with partitions of different sizes and shapes disposed within the outer boundary. In one example, a user input is received as part of initiation of generation of the collage to specify a desired outer boundary shape. In another example, the outer boundary shape is determined automatically and without user intervention as part of generating the collage.

The plurality of layouts 208 in the illustrated example include a partition grammar 210 that specifies a number of partitions within the layout 208 as well as an aspect ratio of those partitions. Therefore, to begin as shown in FIG. 6, the candidate generation module 132 employs a layout selection module 602 to select layouts 208 having a number of partitions that match the number of digital images 106(1)-106(4) to be included in the collage based on the partition grammar 210.

The candidate generation module 132 then iterates through the partitions in the layouts 208 accordingly to the partition grammar 210, such as HHHH, VVHH, VVVH, respectively for the illustrated collage candidates 206(1), 206(2), 206(3) having four horizontal partitions, three vertical and one horizontal partition, and two vertical and two horizontal partitions. Thus, the partition grammar 210 is this instance is used as a guide to align digital images 106(1)-106(4) with respective partitions based on alignment of respective aspect ratios, e.g., to align horizontal bounding boxes with horizontal partitions, and so on to generate the collage candidates 206(1)-206(3).

This process may iterate by the candidate generation module 132 over a single layout as well as for multiple layouts of the subset. The candidate generation module 132, for instance, may fit the digital images 106(1)-106(4) to a single layout in a variety of different combinations. This may also be repeated for other layouts from a subset of layouts 208 having the matching number of partitions to generate the collage candidates 206.

The collage candidates 206 are then provided to a deviation determination module 134. The deviation determination module 134 is configured to determine amounts 212 that the plurality of collage candidates 206 deviate, respectively, from the plurality of bounding boxes 204 (block 908). As illustrated in the example implementation 700 of FIG. 7, for instance, the deviation determination module 134 receives the plurality of collage candidates 206(1)-206(3). The deviation determination module 134 also receives data indicative of the bounding boxes 204(1)-204(4) used to describe saliency of respective pixels of the digital images 106(1)-106(4).

From this, the deviation determination module 134 determines an amount the digital images 106(1)-106(4), as fit to respective partitions in the collage candidates 206(1)-206(3) differ from the bounding boxes 204(1)-204(4). This determination may be made based on a variety of factors. In one example, this determination is based on an amount of change in an aspect ratio between the portions of the digital images 106(1)-106(4) as included in the collage candidates differ from aspect ratios of the bounding boxes 204(1)-204(4). An example of pseudo-code 800 that makes the determination based on aspect ratio is illustrated in FIG. 8.

In another example, this determination is based on an amount of area of the bounding boxes 204(1)-204(4) that is maintained by digital images 106(1)-106(4) as included in the collage candidates 206(1)-206(3). In a further example, this determination is based on an amount of salient pixels of the bounding boxes 204(1)-204(4) that is maintained by digital images 106(1)-106(4) as included in the collage candidates 206(1)-206(3). In this way, the amounts of deviation 212 describe how much of the salient pixels of the digital images 106(1)-106(4) are preserved by respective collage candidates 206(1)-206(3).

Thus, the amounts of deviation 202 are used by a collage selection module 136 to select at least one collage 122 from the plurality of collage candidates 206(1)-206(3) (block 910), which is then output (block 912) in a user interface 110. The collage selection module 136, for instance, may rank the collage candidates 206(1)-206(3) and select the candidate that exhibits the least amount of deviation 212. In another example, the collage selection module 136 outputs more than one selection, such as through a ranked list based on the amounts of deviation 212 to provide additional options that are user selectable.

In this way, the candidate generation module 132 is configured to generate the collage 122 in real time automatically and without user intervention as having an optimal layout based on saliency of pixels within the digital images, and may do so automatically and without user intervention. As illustrated in FIG. 7, for instance, collage 122 is selected as collage candidate 206(2) that includes significantly more salient portions of the respective digital images 106(1)-106(4) than collage candidates 206(1) and 206(3). Likewise, as illustrated in FIG. 1, collage candidate 122 that includes the children is selected over collage candidates 124, 126 in which portions of the children are omitted.

Example System and Device

Figure 10:
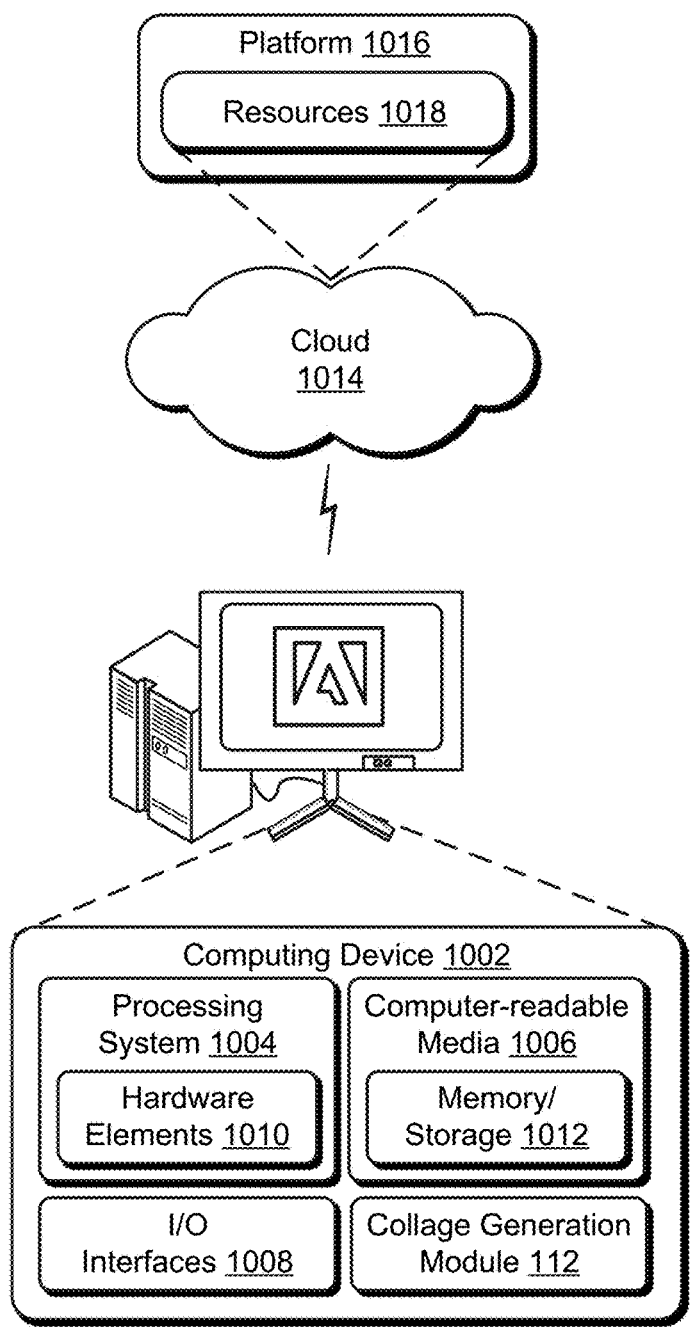
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the collage generation module 112. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate at least one collage from a plurality of digital images, a method implemented by a computing device, the method comprising:
   generating, by the computing device, a plurality of saliency maps from the plurality of digital images, the plurality of saliency maps describing a visual saliency of respective pixels in the plurality of digital images;
   fitting, by the computing device, a plurality of bounding boxes to the plurality of digital images based on the plurality of saliency maps;
   generating, by the computing device, a plurality of collage candidates based on a plurality of layouts, the plurality of digital images, and the plurality of bounding boxes;
   determining, by the computing device, an amount the plurality of collage candidates deviate, respectively, from the plurality of bounding boxes;
   selecting, by the computing device, the at least one collage from the plurality of collage candidates based on the determined amounts; and
   outputting, by the computing device, the selected at least one collage.

2. The method as described in claim 1, wherein the visual saliency of a respective said pixel is based on determined differences in color, intensity, or texture of the respective said pixel as compared to other said pixels included in a neighborhood of the respective said pixel.

3. The method as described in claim 1, wherein the fitting of the plurality of bounding boxes includes:
   identifying, for each said digital image, pixels that are salient and pixels that are not salient based on a respective said saliency map; and defining a respective said bounding box as having edges that include a threshold amount of the pixels that are salient based on the identifying.

4. The method as described in claim 3, wherein the identifying includes comparing saliency values of the respective said pixels to a saliency threshold.

5. The method as described in claim 1, wherein the determining the amount of deviation is based at least in part on determining an amount of change in an aspect ratio of a respective said bounding box as included in a respective said collage candidate.

6. The method as described in claim 1, wherein the determining the amount of deviation is based at least in part on determining an amount of area that is maintained of a respective said bounding box as included in a respective said collage candidate.

7. The method as described in claim 1, wherein the determining the amount of deviation is based at least in part on determining an amount of the salient pixels that are maintained of a respective said bounding box as included in a respective said collage candidate.

8. The method as described in claim 1, wherein the generating of the plurality of saliency maps, the fitting, the generating of the plurality of collage candidates, the determining, and the selecting are performed by the computing device automatically and without user intervention.

9. The method as described in claim 1, wherein the plurality of layouts include an outer border and a plurality of partitions that are configured to include respective portions of the plurality of digital images.

10. In a digital medium environment to generate a collage from a plurality of digital images automatically and without user intervention, a system comprising:
   a saliency estimation module implemented at least partially in hardware of a computing device to generate a plurality of saliency maps from the plurality of digital images automatically and without user intervention, the plurality of saliency maps describing a visual saliency of respective pixels in the plurality of digital images;
   a bounding box determination module implemented at least partially in hardware of the computing device to fit a plurality of bounding boxes to the plurality of digital images based on the plurality of saliency maps automatically and without user intervention;
   a candidate generation module implemented at least partially in hardware of the computing device to generate a plurality of collage candidates based on a plurality of layouts automatically and without user intervention, the plurality of digital images, and the plurality of bounding boxes;
   a deviation determination module implemented at least partially in hardware of the computing device to determine an amount the plurality of collage candidates deviate, respectively, from the plurality of bounding boxes automatically and without user intervention; and
   a collage selection module implemented at least partially in hardware of the computing device to select the collage for output automatically and without user intervention from the plurality of collage candidates based on the determined amounts.

11. The system as described in claim 10, wherein the saliency estimation module is configured to determine visual saliency of a respective said based on determined differences in color, intensity, or texture of the respective said pixel as compared to other said pixels included in a neighborhood of the respective said pixel.

12. The system as described in claim 10, wherein the bounding box determination module is configured to fit of the plurality of bounding boxes by:
   identifying, for each said digital image, pixels that are salient and pixels that are not salient based on a respective said saliency map; and
   defining a respective said bounding box as having edges that include a threshold amount of the pixels that are salient based on the identifying.

13. The system as described in claim 10, wherein the deviation determination module is configured to determine the amount of deviation based at least in part on determining an amount of change in an aspect ratio of a respective said bounding box as included in a respective said collage candidate.

14. The system as described in claim 10, wherein the deviation determination module is configured to determine the amount of deviation based on an amount of area that is maintained of a respective said bounding box as included in a respective said collage candidate.

15. The system as described in claim 10, wherein the deviation determination module is configured to determine the amount of deviation based on an amount of the salient pixels that are maintained of a respective said bounding box as included in a respective said collage candidate.

16. In a digital medium environment to generate a collage from a plurality of digital images, a method implemented by a computing device, the method comprising:
   means for generating a plurality of saliency maps from the plurality of digital images, the plurality of saliency maps describing a visual saliency of respective pixels in the plurality of digital images;
   means for fitting a plurality of bounding boxes to the plurality of digital images based on the plurality of saliency maps;
   means for generating a plurality of collage candidates based on a plurality of layouts, digital images, and bounding boxes;
   means for determining an amount the plurality of collage candidates deviate, respectively, from the plurality of bounding boxes;
   means for generating, based on the determined amounts, a ranking of collage candidates;
   means for selecting at least one collage from the plurality of collage candidates based on the generated ranking; and
   means for outputting the selected at least one collage.

17. The system as described in claim 16, wherein the saliency generation means is configured to determine visual saliency of a respective said based on determined differences in color, intensity, or texture of the respective said pixel as compared to other said pixels included in a neighborhood of the respective said pixel.

18. The system as described in claim 16, wherein the fitting means is configured to fit of the plurality of bounding boxes by:
   identifying, for each said digital image, pixels that are salient and pixels that are not salient based on a respective saliency map; and
   defining a respective said bounding box as having edges that include a threshold amount of the pixels that are salient based on the identifying.

19. The system as described in claim 16, wherein the determining means is configured to determine the amount of deviation based at least in part on determining an amount of change in an aspect ratio of a respective said bounding box as included in a respective said collage candidate.

20. The system as described in claim 16, wherein the determining means is configured to determine the amount of deviation based on:
- an amount of area that is maintained of a respective said bounding box as included in a respective said collage candidate; or
- an amount of the salient pixels that are maintained of a respective said bounding box as included in a respective said collage candidate.

* * * * *